United States Patent
Rowley

(10) Patent No.: US 12,415,628 B2
(45) Date of Patent: Sep. 16, 2025

(54) ADAPTER FOR ATTACHING A DOCKING SYSTEM TO A COMMON BERTHING MECHANISM MOUNTING INTERFACE

(71) Applicant: Mark D. Rowley, Friendswood, TX (US)

(72) Inventor: Mark D. Rowley, Friendswood, TX (US)

(73) Assignee: Arrow Science & Technology, LLC, Webster, TX (US)

( * ) Notice: Subject to any disclaimer, the term of this patent is extended or adjusted under 35 U.S.C. 154(b) by 272 days.

(21) Appl. No.: 18/465,842

(22) Filed: Sep. 12, 2023

(65) Prior Publication Data

US 2025/0033804 A1  Jan. 30, 2025

Related U.S. Application Data

(63) Continuation-in-part of application No. 29/880,518, filed on Jul. 24, 2023, now Pat. No. Des. 1,051,811.

(51) Int. Cl.
*B64G 1/64* (2006.01)
(52) U.S. Cl.
CPC .................................. *B64G 1/641* (2013.01)
(58) Field of Classification Search
CPC ........ B64G 1/002; B64G 1/005; B64G 1/006; B64G 1/008; B64G 1/12; B64G 1/223; B64G 1/60; B64G 1/64; B64G 1/641; B64G 1/642; B64G 1/6425; B64G 1/645;
(Continued)

(56) References Cited

U.S. PATENT DOCUMENTS

| 3,201,065 A | 8/1965 | Dunn |
| 3,443,773 A | 5/1969 | Blumrich et al. |
| 4,898,348 A | 2/1990 | Kahn |

(Continued)

FOREIGN PATENT DOCUMENTS

| CN | 109050989 A | * 12/2018 | ............. B64G 1/641 |
| CN | 111619831 A | *  9/2020 | ............... B64G 1/22 |

(Continued)

OTHER PUBLICATIONS

Wikiwand, International Docking Adapter, Retrieved From Internet, Retrieved on Jul. 24, 2023, <URL: https://www.wikiwand.com/en/International_Docking_Adapter>.

*Primary Examiner* — Joshua E Rodden

(57) ABSTRACT

An adapter for attaching a docking system to a common berthing mechanism mounting interface is a device that enables a system with an integrated mounting mechanism to be coupled to an external system by using an alternate mounting mechanism. The device includes a hollow body, a first interfacing ring, a second interfacing ring, several first holes, and several second holes. The hollow body enables the transition from the integrated mounting mechanism to the alternate mounting mechanism. The first interfacing ring enables the fastening of the hollow body to the alternate mounting mechanism. The first holes enable the use of appropriate fasteners to secure the hollow body to the alternate mounting mechanism. The second interfacing ring enables the fastening of the hollow body to the integrated mounting mechanism. The second holes enable the use of appropriate fasteners to secure the hollow body to the integrated mounting mechanism.

20 Claims, 14 Drawing Sheets

(58) Field of Classification Search
CPC .. B64G 1/6455; B64G 1/6457; B64G 1/6459; B64G 1/646; B64G 1/6462; B64G 1/6464
USPC ........................................ 244/173.3; 403/333
See application file for complete search history.

(56) References Cited

U.S. PATENT DOCUMENTS

| | | | |
|---|---|---|---|
| 12,358,654 B1* | 7/2025 | Tahk ...................... | B64G 1/645 |
| 2006/0192057 A1* | 8/2006 | Smith ..................... | B64G 1/643 |
| | | | 244/173.1 |
| 2008/0048069 A1* | 2/2008 | Zheng ................... | F16F 15/022 |
| | | | 188/379 |
| 2014/0151509 A1 | 6/2014 | Zelon | |
| 2024/0228070 A1* | 7/2024 | Kuehn .................... | B64G 1/645 |
| 2024/0239522 A1* | 7/2024 | Hadaller ................ | B64G 1/641 |

FOREIGN PATENT DOCUMENTS

| | | | | |
|---|---|---|---|---|
| CN | 114933030 A | * | 8/2022 | ............... B64G 1/66 |
| WO | WO-2025088493 A1 | * | 5/2025 | ........... B64G 1/6462 |

* cited by examiner

ADAPTER FOR ATTACHING A DOCKING SYSTEM TO A COMMON BERTHING MECHANISM MOUNTING INTERFACE

The current application is a continuation-in-part (CIP) application of the U.S. design application Ser. No. 29/880,518 filed on Jul. 24, 2023.

FIELD OF THE INVENTION

The present invention relates generally to adapters and mounting systems. More specifically, the present invention provides a mechanism that facilitates the attachment of different mounting systems to each other.

BACKGROUND OF THE INVENTION

Typical International Space Station (ISS) pressurized modules (excluding Russian modules) consists of a cylindrical pressure shell of welded aluminum construction, with active or passive Common Berthing Mechanisms (CBMs) bolted onto both ends. An Active CBM (ACBM) bolted to a CBM bulkhead allows the completed module to be structurally attached to another module or visiting vehicle that is equipped with a Passive CBM (PCBM). Conversely, a PCBM bolted to a CBM bulkhead allows a module or visiting vehicle to be structurally attached to another module that is equipped with an ACBM. Further, for an ISS module, docking system bulkheads can be integrally welded into the module structure. The docking system bolted to the docking system bulkhead allows the ISS module to be structurally attached to another module or visiting vehicle that is equipped with a mating docking system. The docking system can be, but is not limited to, the International Berthing & Docking Mechanism (IBDM), the NASA Docking System (NDS), or other docking systems. Because the standard interfaces required for docking systems and CBMs are different, a space station module developer must select their preferred interface years ahead of time so that the manufacturer can incorporate the appropriate bulkhead interface into the welded module structure. Once the module is built, a change of the bulkhead interface is extremely difficult and expensive. To streamline module production, a common bulkhead design would be advantageous to the module manufacturer. If a CBM bulkhead is selected as the standard interface, then the module could accommodate active or passive CBMs.

An objective of the present invention is to provide a ground-installed adapter for attaching a docking system to a common berthing mechanism (CBM) mounting interface. The adapter for attaching a docking system to a CBM mounting interface can be fastened to the CBM bulkhead to convert from a CBM interface to a docking system interface. The adapter for attaching a docking system to a CBM mounting interface also features the interface for the docking system. Thus, the present invention allows the space station module manufacturer to standardize the structural design of the module by using CBM bulkheads exclusively. If a module customer decides that a docking system at a particular port is needed, the docking system is easily accommodated by installing the present invention onto the module. Additional features and benefits of the present invention are further discussed in the sections below.

SUMMARY OF THE INVENTION

The present invention is an adapter for attaching a docking system to a common berthing mechanism (CBM) mounting interface. The present invention enables a system with an integrated mounting mechanism to utilize a different mounting mechanism without having to replace the integrated mounting mechanism. This way, the present invention provides more flexibility during the manufacturing process to not limit the options available when selecting the mounting mechanisms for the desired system. To do so, the present invention includes a hollow structure that serves as an interface between the two separate mounting mechanisms that may not be compatible with each other. The present invention also includes two fastening interfaces that allow the hollow structure to be fastened to the corresponding mounting mechanism using the appropriate fastening interface. This way, an alternate mounting mechanism can be adapted to the integrated mounting mechanism with the present invention so that the system can be attached to an external system using the alternate mounting mechanism.

DETAIL DESCRIPTIONS OF THE INVENTION

Figure 1:
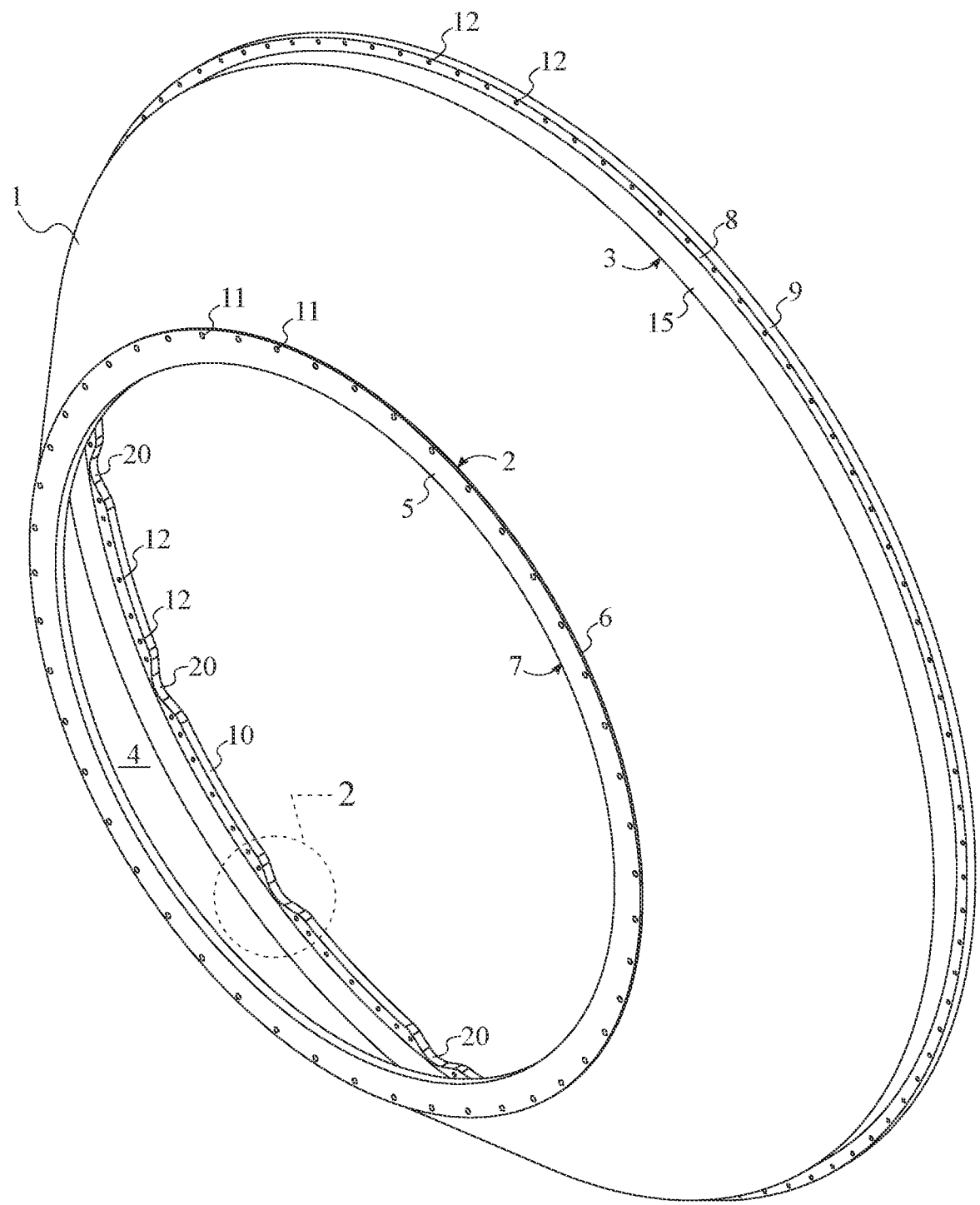
FIG. 1 is a top front perspective view of the present invention.
Figure 2:
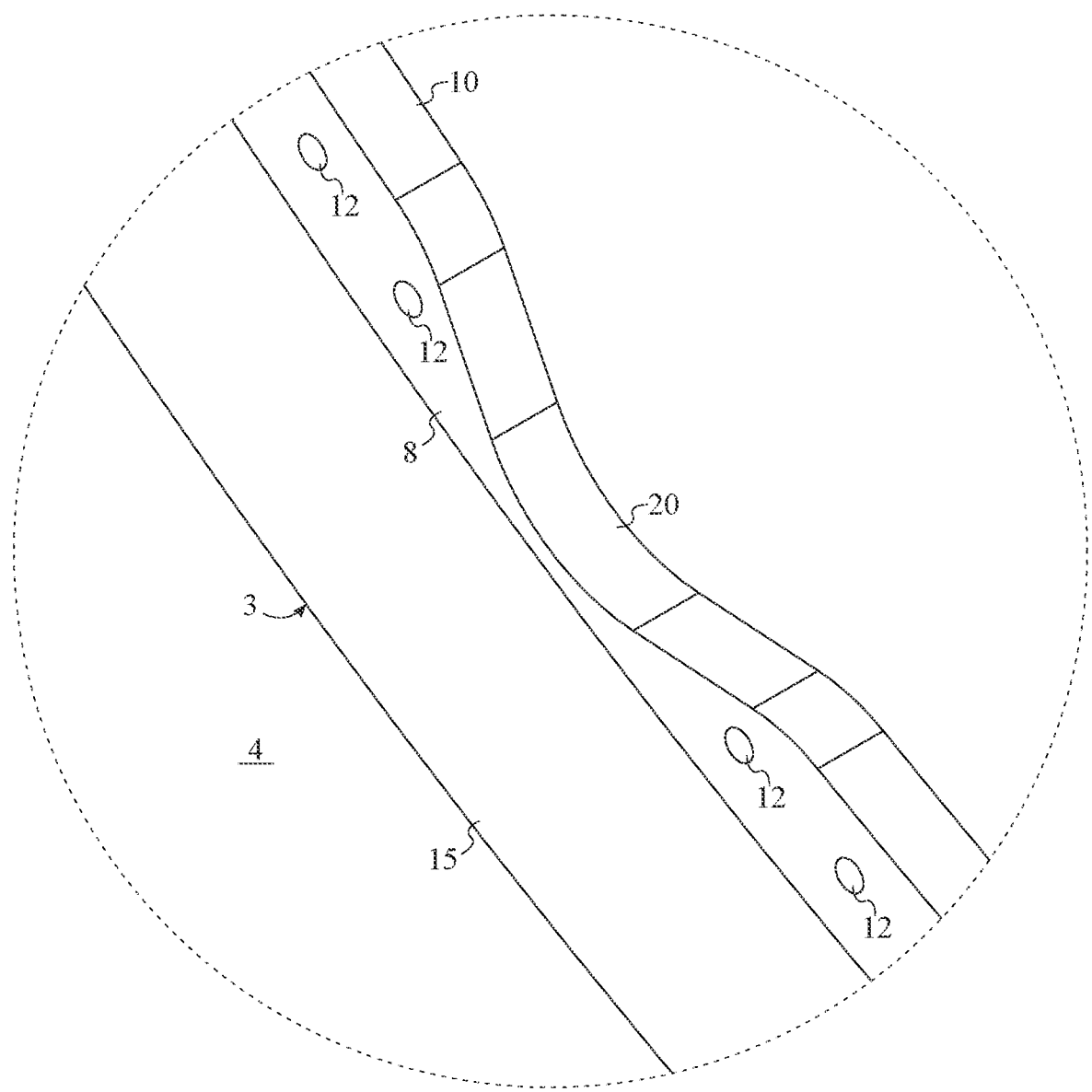
FIG. 2 is a magnified view taken about circle 2 in FIG. 1 showing several indentations of the present invention.
Figure 3:
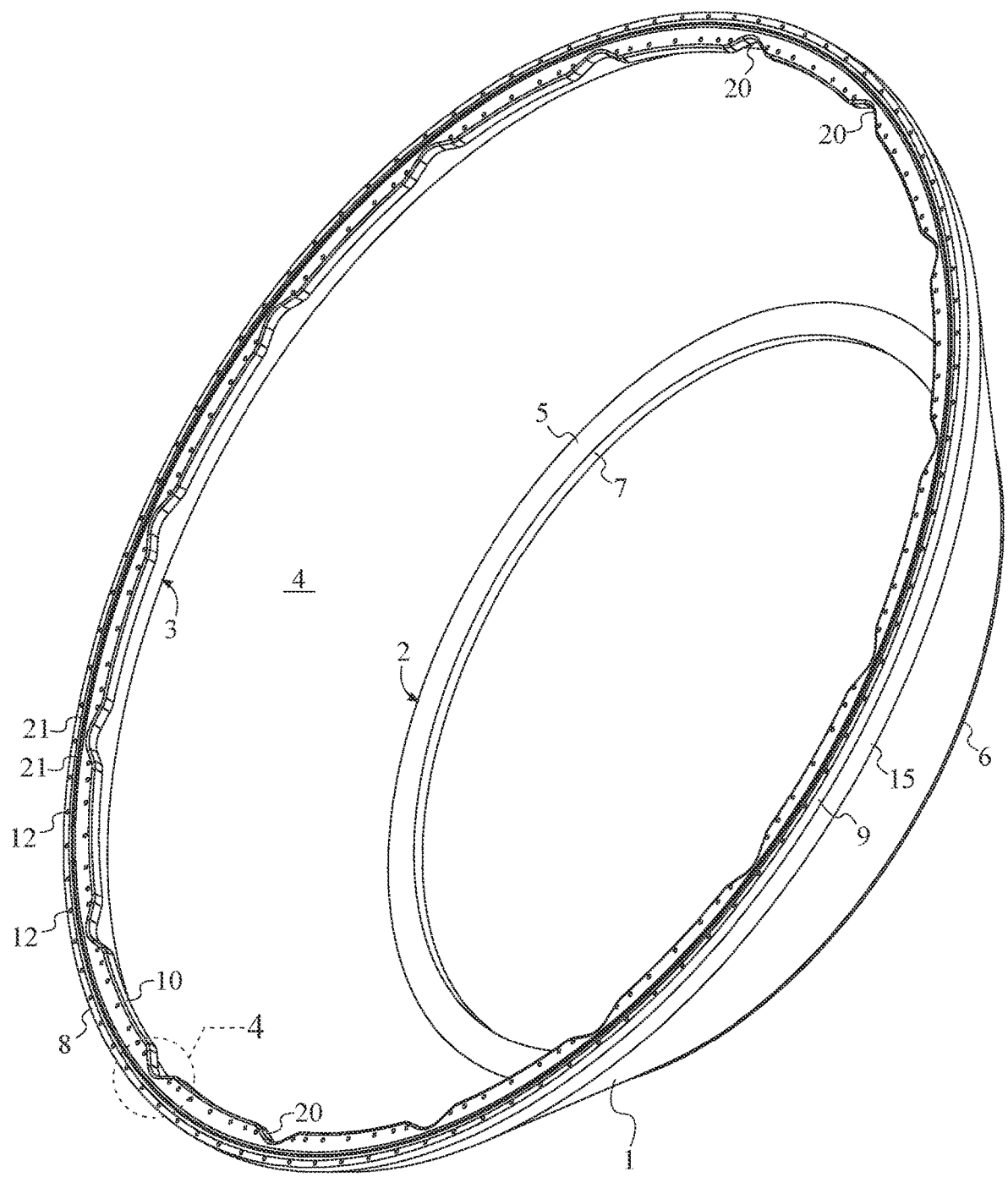
FIG. 3 is a bottom rear perspective view of the present invention.
Figure 4:
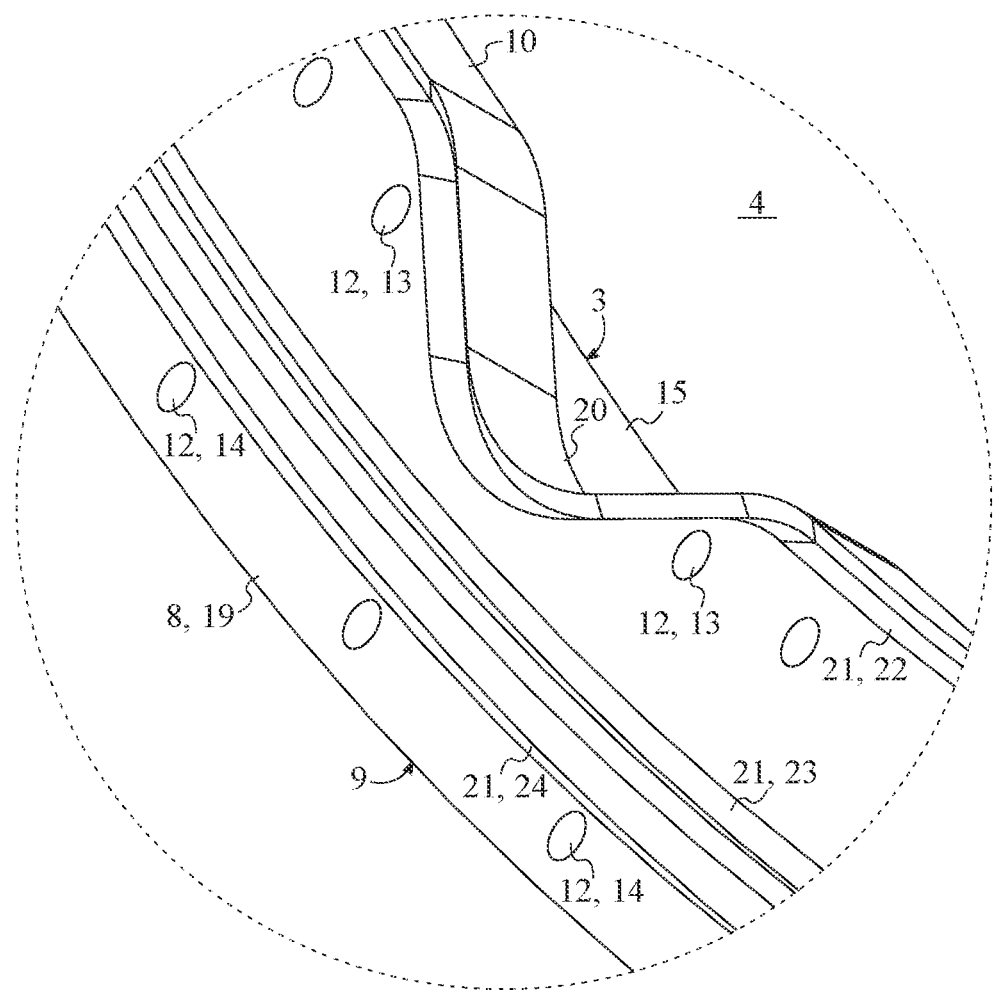
FIG. 4 is a magnified view taken about circle 4 in FIG. 3 showing the second interfacing ring of the present invention.
Figure 5:
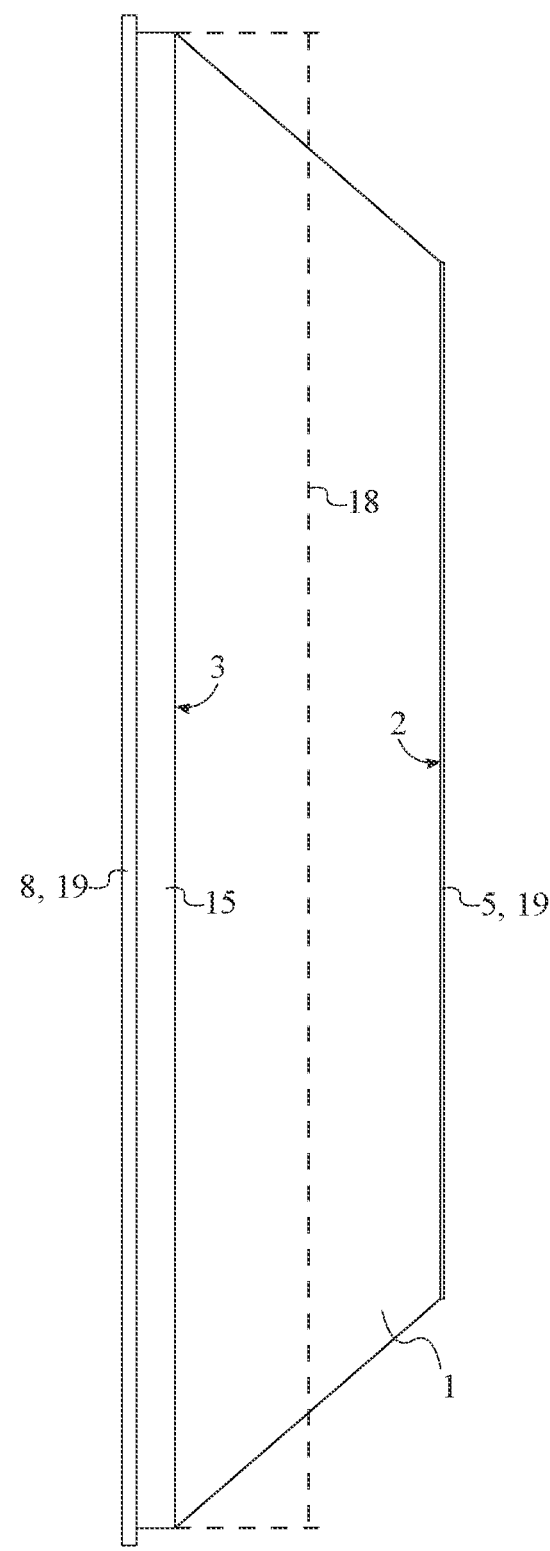
FIG. 5 is a side view of the present invention.
Figure 6:
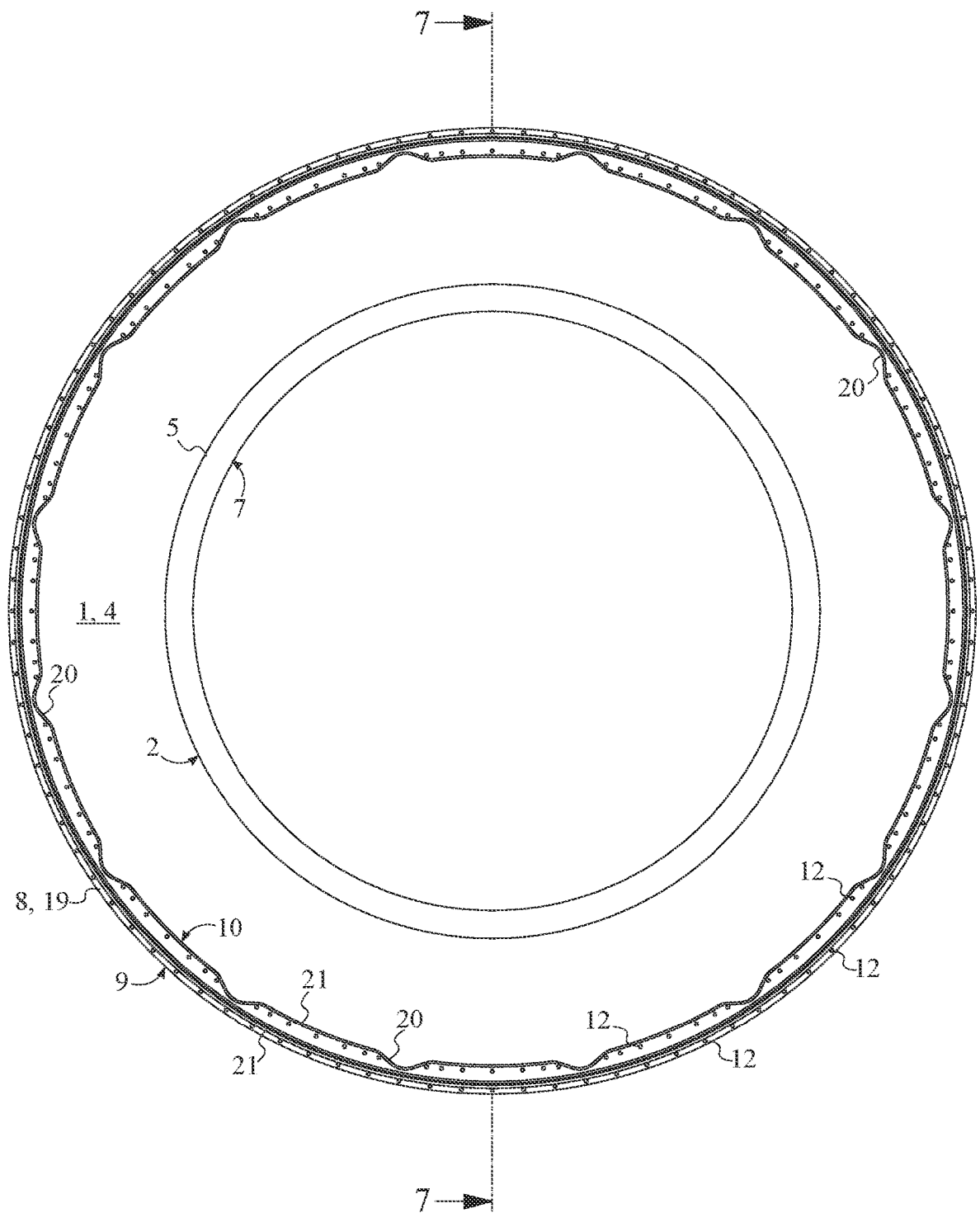
FIG. 6 is a rear view of the present invention.
Figure 7:
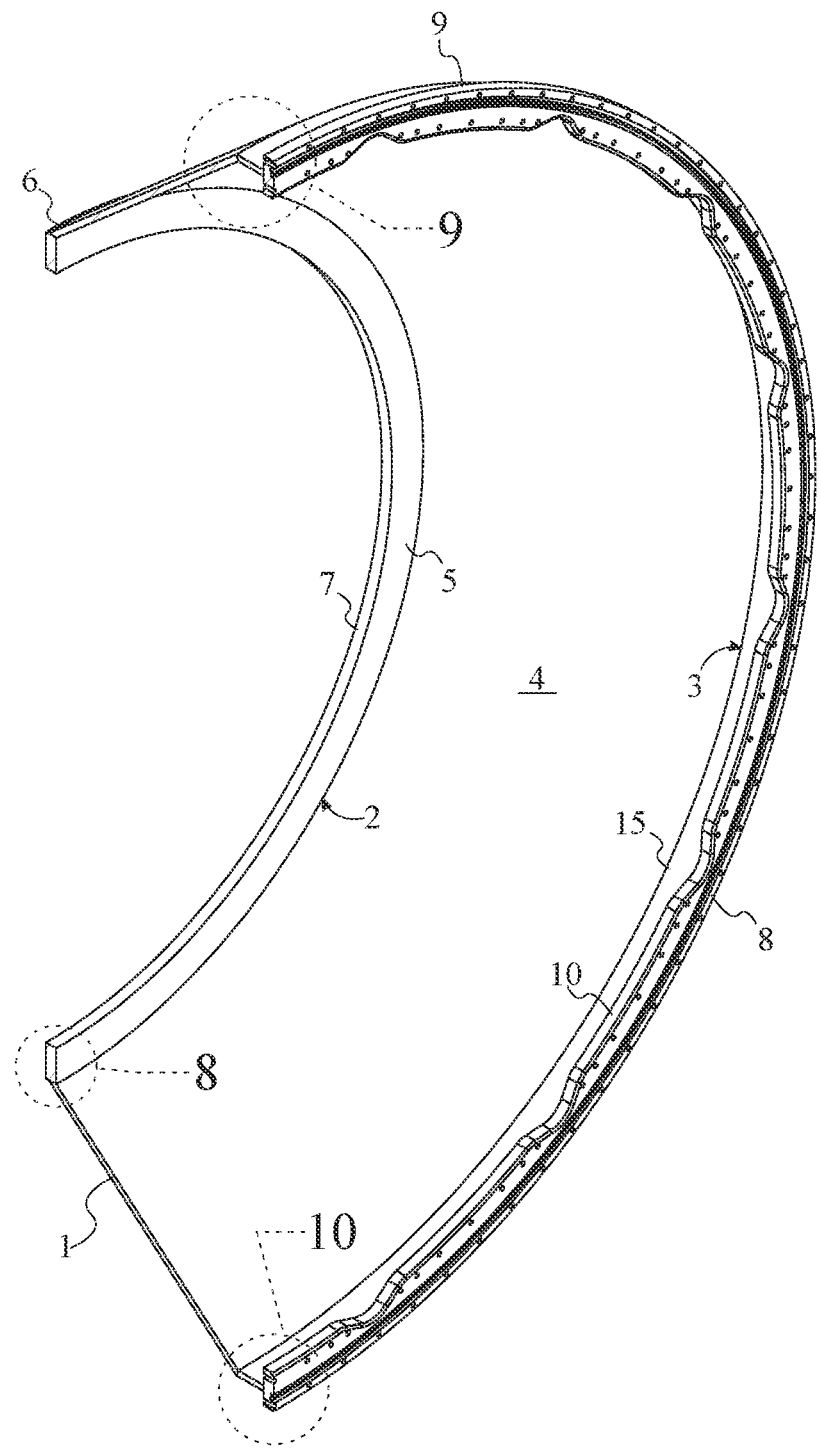
FIG. 7 is a perspective cross-sectional view taken along line 7-7 in FIG. 6.
Figure 8:
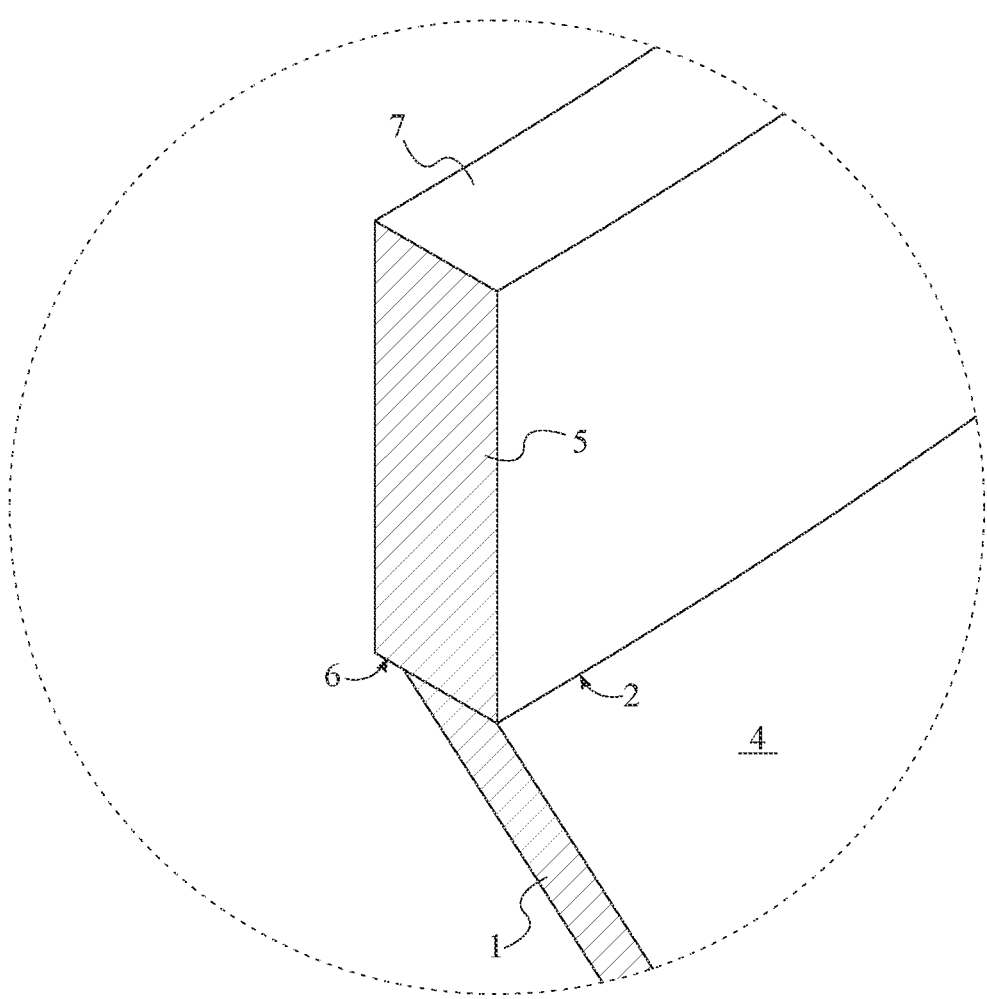
FIG. 8 is a magnified view taken about circle 8 in FIG. 7 showing the first interfacing ring of the present invention.
Figure 9:
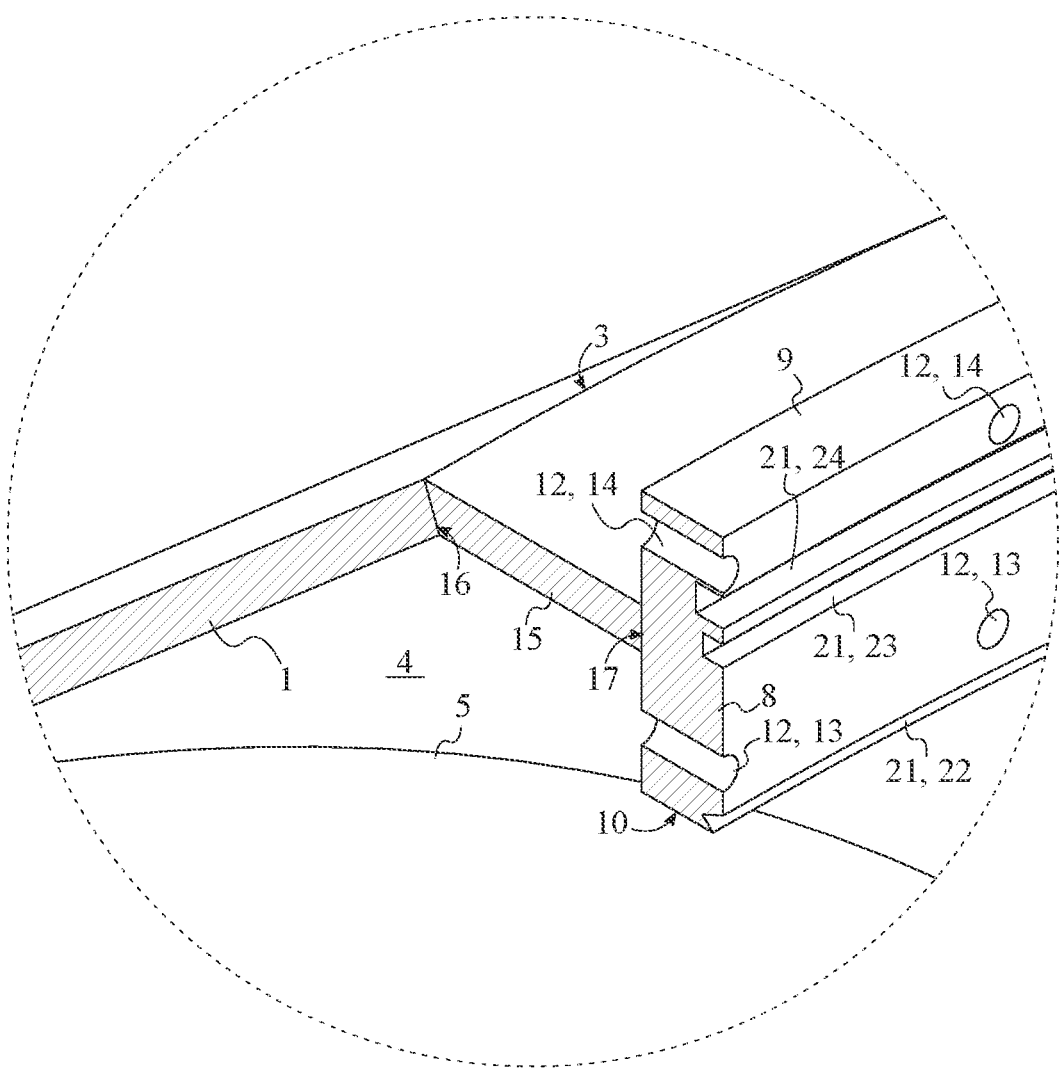
FIG. 9 is a magnified view taken about circle 9 in FIG. 7 showing the second interfacing ring of the present invention.
Figure 10:
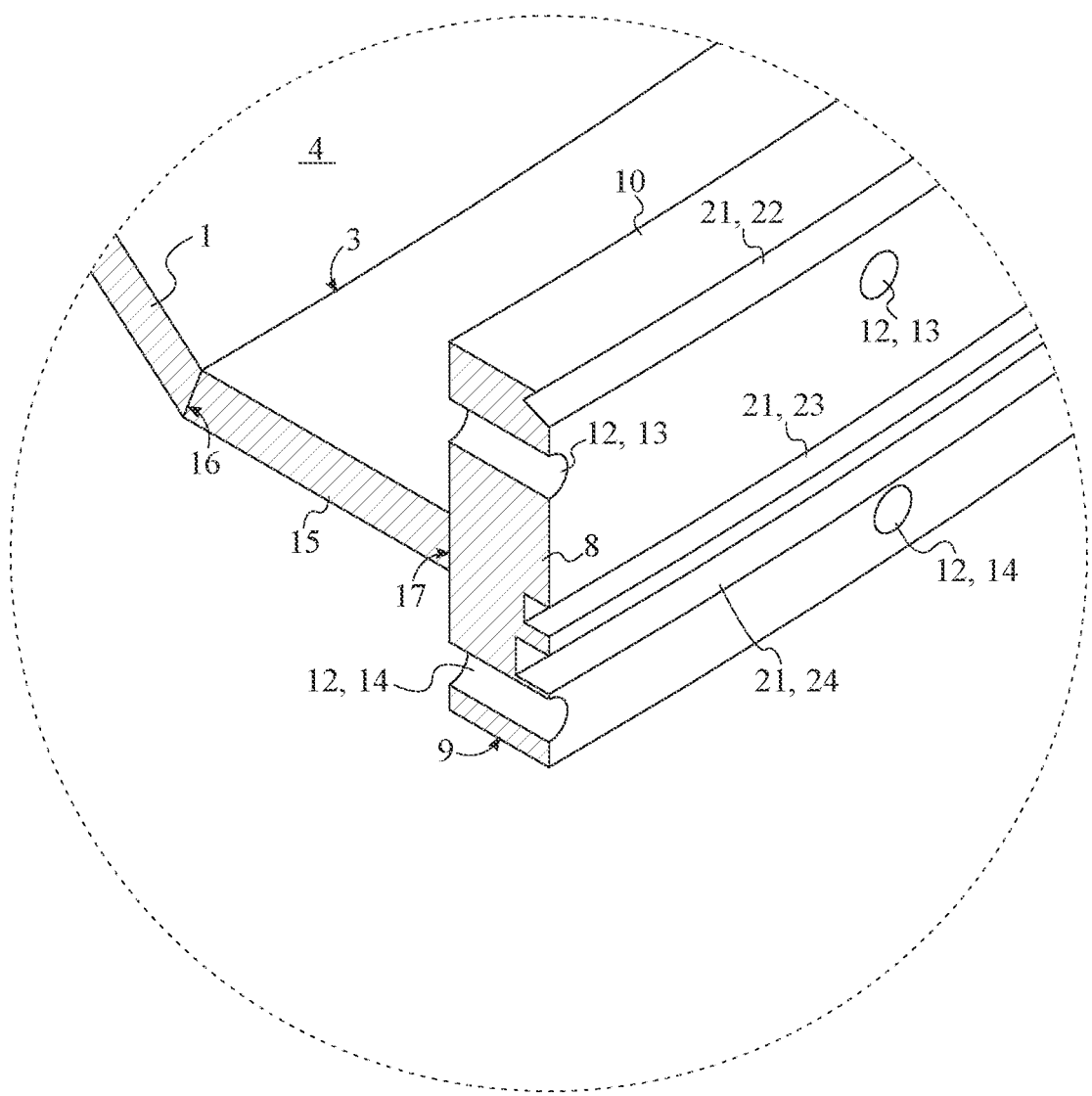
FIG. 10 is a magnified view taken about circle 10 in FIG. 7 showing the second interfacing ring of the present invention.

All illustrations of the drawings are for the purpose of describing selected versions of the present invention and are not intended to limit the scope of the present invention.

The present invention is an adapter for attaching a docking system to a common berthing mechanism (CBM) mounting interface. The present invention enables a system with an integrated mounting mechanism to be coupled to an external system by using an alternate mounting mechanism. As can be seen in FIGS. 1 through 10, the present invention comprises a hollow body 1, a first interfacing ring 5, a second interfacing ring 8, a plurality of first holes 11, and a plurality of second holes 12. The hollow body 1 serves as an interfacing structure that enables the transition from the system's integrated mounting mechanism to the alternate mounting mechanism. The first interfacing ring 5 is designed to enable the fastening of the hollow body 1 to the alternate mounting mechanism. The plurality of first holes 11 enables the use of several appropriate fasteners to securely fasten the hollow body 1 to the alternate mounting mechanism. Similarly, the second interfacing ring 8 is designed to enable the fastening of the hollow body 1 to the system's integrated mounting mechanism. The plurality of second holes 12 enables the use of several appropriate fasteners to securely fasten the hollow body 1 to the system's integrated mounting mechanism.

The general configuration of the aforementioned components enables a system to be coupled to a separate system using an alternate mounting mechanism without having to replace the integrated mounting mechanism. As can be seen in FIGS. 1 through 13, the hollow body 1 preferably corresponds to a hollow structure designed to adapt a system's integrated mounting mechanism with an alternate mounting mechanism. For example, the hollow body 1 can be a structure with a truncated conical shape that accommodates both the CBM of a pressurized module and a docking system to enable the pressurized module to dock to the International Space Station (ISS) using the docking system. Accordingly, the hollow body 1 comprises a diametrically-smaller open end 2 and a diametrically-larger open end 3. The diametrically-smaller open end 2 and the diametrically-larger open end 3 correspond to the opposite open ends of the hollow body 1 of different size to accommodate both the integrated mounting mechanism and the alternate mounting mechanism. So, the diametrically-smaller open end 2 and the diametrically-larger open end 3 are positioned opposite to each other about the hollow body 1 due to the conical shape of the hollow body 1. Further, the diametrically-smaller open end 2, the diametrically-larger open end 3, the first interfacing ring 5, and the second interfacing ring 8 are concentrically positioned with each other to maintain an overall symmetrical design of the hollow body 1.

As can be seen in FIGS. 1 through 10, to secure the first interfacing ring 5 to the hollow body 1, the first interfacing ring 5 is connected around the diametrically-smaller open end 2. Similarly, the second interfacing ring 8 is mounted around the diametrically-larger open end 3 to secure the second interfacing ring 8 to the hollow body 1. Further, the plurality of first holes 11 is distributed around the first interfacing ring 5 to accommodate several fasteners around the first interfacing ring 5. In addition, the plurality of first holes 11 traverses into the first interfacing ring 5, opposite to the hollow body 1, to allow the first interfacing ring 5 to be fastened to the alternate mounting mechanism. Similarly, the plurality of second holes 12 is distributed around the second interfacing ring 8 to accommodate several fasteners around the second interfacing ring 8. In addition, the plurality of second holes 12 traverses through the second interfacing ring 8 to allow the second interfacing ring 8 to be fastened to the system's integrated mounting mechanism. In other embodiments, the hollow body 1 can include different designs that accommodate different mounting mechanisms.

In some embodiments, the present invention can include means to extend the reach of the hollow body 1 without increasing the overall length of the hollow body 1. As can be seen in FIGS. 1 through 10, the present invention may further comprise a tubular extension 15 that offsets the second interfacing ring 8 from the diametrically-larger open end 3. To accommodate the design of the hollow body 1, the tubular extension 15 has a matching design that enables the seamless transition from the system's integrated mounting mechanism to the alternate mounting mechanism. For example, when the hollow body 1 has a conical shape, the tubular extension 15 can have a short, cylindrical shape that matches the size of the diametrically-larger open end 3. Due to the cylindrical shape of the tubular extension 15, the tubular extension 15 comprises a proximal open end 16 and a distal open end 17 that correspond to the opposite open ends of the tubular extension 15.

Accordingly, the proximal open end 16 the distal open end 17 are positioned opposite to each other about the tubular extension 15. As can be seen in FIGS. 1 through 10, the tubular extension 15 is concentrically positioned with the diametrically-smaller open end 2, the diametrically-larger open end 3, the first interfacing ring 5, and the second interfacing ring 8 to maintain the symmetrical design of the present invention. Further, the proximal open end 16 is connected around the diametrically-larger open end 3 to secure the tubular extension 15 to the hollow body 1. The second interfacing ring 8 is also connected around the distal open end 17 so that the second interfacing ring 8 is connected to the hollow body 1 by the tubular extension 15. Furthermore, as previously discussed, the size of the tubular extension 15 preferably matches the size of the hollow body 1. So, a diameter 18 of the proximal open end 16 and a diameter 18 of the distal open end 17 can be equal to a diameter 18 of the diametrically-larger open end 3. In other embodiments, the tubular extension 15 may have a different shape or size to accommodate different designs of the hollow body 1.

As can be seen in FIGS. 1 through 10, the first interfacing ring 5 and the second interfacing ring 8 are preferably designed to enable the secure coupling of the hollow body 1 to both the system's integrated mounting mechanism and the alternate mounting mechanism. To do so, the first interfacing ring 5 and the second interfacing ring 8 can be a pair of flat annular bodies 19 that facilitate the fastening of each interfacing ring to the corresponding mounting mechanism. The pair of flat annular bodies 19 are positioned parallel and offset from each other due to the positioning of the first interfacing ring 5 and the second interfacing ring 8 on the hollow body 1. This way, the alternate mounting mechanism and the system's integrated mounting mechanism can be easily fastened to the first interfacing ring 5 and the second interfacing ring 8, respectively.

When the first interfacing ring 5 is a flat annular body 19, the first interfacing ring 5 can be arranged to match the design of the hollow body 1. As can be seen in FIGS. 1 through 10, the first interfacing ring 5 may comprise a first outer annular edge 6 and a first inner annular edge 7. The first outer annular edge 6 and the first inner annular edge 7 preferably correspond to the concentric edges of the flat annular body 19 of the first interfacing ring 5. Further, the first outer annular edge 6 is connected around the diametrically-smaller open end 2 to secure the first interfacing ring 5 to the hollow body 1. In addition, the first inner annular edge 7 is encircled by the diametrically-smaller open end 2. This way, the first interfacing ring 5 does not protrude past the diametrically-smaller open end 2. Further, due to the flat annular body 19 of the first interfacing ring 5, the plurality of first holes 11 can be evenly distributed throughout the flat annular body 19 so that the alternate mounting mechanism can be securely fastened to the first interfacing ring 5. As can be seen in FIGS. 1 through 10, the plurality of first holes 11 is radially distributed around the first interfacing ring 5 so that several appropriate fasteners can be used. In addition, each of the plurality of first holes 11 traverse perpendicular into the first interfacing ring 5 to prevent the plurality of first holes 11 from crossing each other throughout the first interfacing ring 5.

Similar to the first interfacing ring 5, when the second interfacing ring 8 is a flat annular body 19, the second interfacing ring 8 can also be arranged to match the design of the hollow body 1. As can be seen in FIGS. 1 through 10, the second interfacing ring 8 may comprise a second outer annular edge 9 and a second inner annular edge 10. The second outer annular edge 9 and the second inner annular edge 10 preferably correspond to the concentric edges of the flat annular body 19 of the second interfacing ring 8. Unlike the first interfacing ring 5, the diametrically-larger open end 3 is encircled by the second outer annular edge 9. However, like the first interfacing ring 5, the second inner annular edge 10 is encircled by the diametrically-larger open end 3. This way, the second interfacing ring 8 has a large interface area that can be in contact with the system's integrated mounting mechanism.

Due to the larger interfacing area of the second interfacing ring 8, the second interfacing ring 8 can accommodate many fasteners to further secure the hollow body 1 to the system's integrated mounting mechanism. As can be seen in FIGS. 1 through 10, the plurality of second holes 12 may comprise a plurality of inner holes 13 and a plurality of outer holes 14. The plurality of inner holes 13 and the plurality of outer holes 14 are designed to accommodate several fasteners at different locations throughout the second interfacing ring 8. The plurality of inner holes 13 and the plurality of outer holes 14 may receive similar or different types of fasteners. Accordingly, both the plurality of inner holes 13 and the plurality of outer holes 14 are radially distributed around the second interfacing ring 8. Further, each of the plurality of inner holes 13 and each of the plurality of outer holes 14 traverse perpendicular through the second interfacing ring 8 to avoid the plurality of second holes 12 from crossing each other. In addition, each of the plurality of outer holes 14 is positioned in between the second outer annular edge 9 and the diametrically-larger open end 3 so that the plurality of outer holes 14 is positioned outside the hollow body 1. On the other hand, each of the plurality of inner holes 13 is positioned in between the diametrically-larger open end 3 and the second inner annular edge 10 so that the plurality of inner holes 13 is positioned inside the hollow body 1. This way, the hollow body 1 can be tightly connected to the system's integrated mounting mechanism by the second interfacing ring 8.

As previously discussed, the second interfacing ring 8 is designed to accommodate the system's integrated mounting mechanism without additional tools. For example, a Passive CBM bulkhead interface can directly receive the second interfacing ring 8 to secure the hollow body 1 to the corresponding module. However, in some embodiments, the second interfacing ring 8 may require to be modified to accommodate some features of the system's integrated mounting mechanism. For example, the standard Active CBM bulkhead interfaces require indentations to provide clearance for sixteen motor-driven bolts that serve to clamp a Passive CBM to an Active CBM. To accommodate these motor-drive bolts, the present invention may further comprise a plurality of indentations 20 that accommodate structural features of the system's integrated mounting mechanism, such as the motor-drive bolts. As can be seen in FIGS. 1 through 10, the plurality of indentations 20 is radially distributed around the second interfacing ring 8. In addition, the plurality of indentations 20 is integrated into the second inner annular edge 10 without obstructing the plurality of inner holes 13. This way, the plurality of indentations 20 is evenly spaced along the second interfacing ring 8 while enabling the fastening of the second interfacing ring 8 to the system's integrated mounting mechanism.

As can be seen in FIGS. 1 through 10, to facilitate a sealed connection between the second interfacing ring 8 to the system's integrated mounting mechanism, the present invention may further comprise a plurality of annular seal-receiving channels 21 that allows the use of different sealing tools, such as O-ring seals. Accordingly, the plurality of annular seal-receiving channels 21 is concentrically positioned with the second interfacing ring 8 so that the selected sealing tools are evenly distributed around the second interfacing ring 8. In addition, the plurality of annular seal-receiving channels 21 traverses into the second interfacing ring 8, opposite to the hollow body 1, to accommodate the selected sealing tools. This way, the selected sealing tools help seal the connection between the second interfacing ring 8 to the system's integrated mounting mechanism.

In some embodiments, the plurality of annular seal-receiving channels 21 may comprise an inner annular channel 22, an intermediate annular channel 23, and an outer annular channel 24. As can be seen in FIGS. 1 through 10, the inner annular channel 22, the intermediate annular channel 23, and the outer annular channel 24 allow for three sealing tools to be utilized to seal the connection. The sealing tools used can be the same type of sealing tool or different types of sealing tools. Accordingly, the outer annular channel 24 is positioned offset from the second outer annular edge 9 to position one of the sealing tools close to the second outer annular edge 9. The inner annular channel 22 is positioned adjacent to the second inner annular edge 10 to position another sealing tool close to the second inner annular edge 10. Further, the intermediate annular channel 23 is positioned in between the second outer annular edge 9 and the second inner annular edge 10 to position another sealing tool in between the other two sealing tools.

Figure 14:
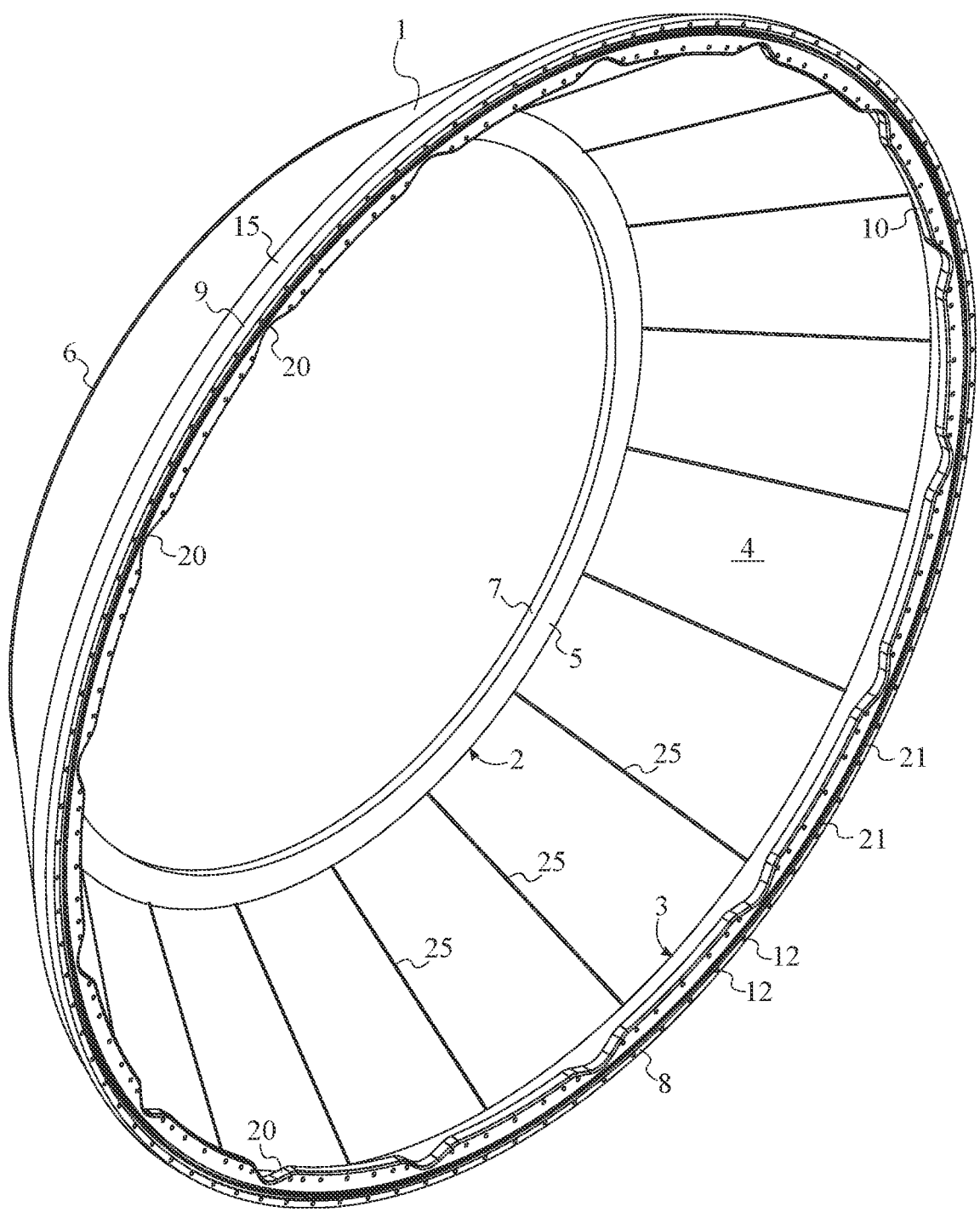
FIG. 14 is a top rear perspective view of the present invention, wherein an embodiment of the present invention is shown with several structural ribs.

Furthermore, the present invention can utilize different means to strengthen the structure of the hollow body 1 to accommodate different system requirements. As can be seen in FIG. 14, in one embodiment, the present invention may further comprise a plurality of structural ribs 25 that strengthen the structure of the hollow body 1. To accommodate the plurality of structural ribs 25, the hollow body 1 may further comprise an interior surface 4. Accordingly, the plurality of structural ribs 25 is positioned within the hollow body 1 and is radially distributed around the hollow body 1. In addition, each of the plurality of structural ribs 25 is connected onto the interior surface 4 to secure the plurality of structural ribs 25 to the hollow body 1. Further, each of the plurality of structural ribs 25 traverses from the diametrically-smaller open end 2 to the diametrically-larger open end 3. Thus, the plurality of structural ribs 25 strengthens the structure of the hollow body 1 without interfering with the transition of the system's integrated mounting mechanism to the alternate mounting mechanism. In other embodiments, different means to strengthen the hollow body 1 can be utilized for different system requirements.

Figure 11:
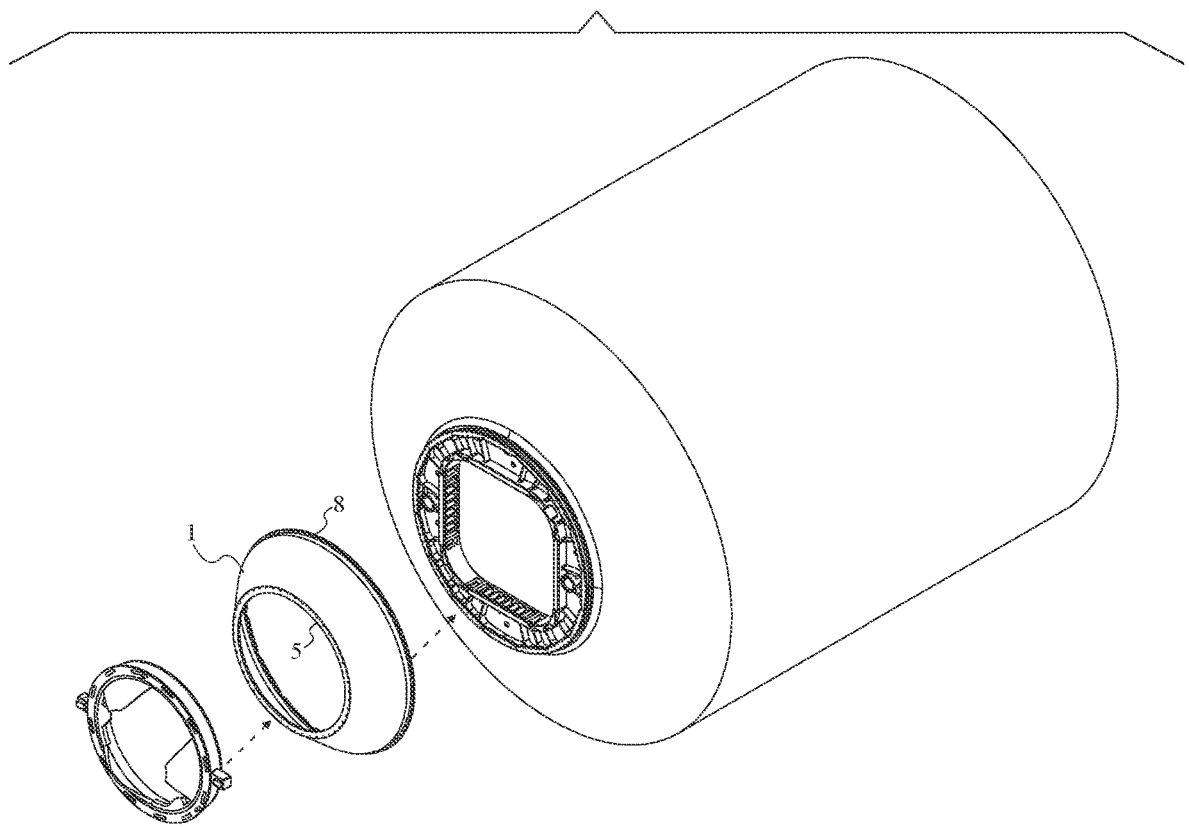
FIG. 11 is a top front exploded perspective view of the present invention, wherein the present invention is shown used to mount a docking system to a common berthing mechanism (CBM) mounting interface.
Figure 12:
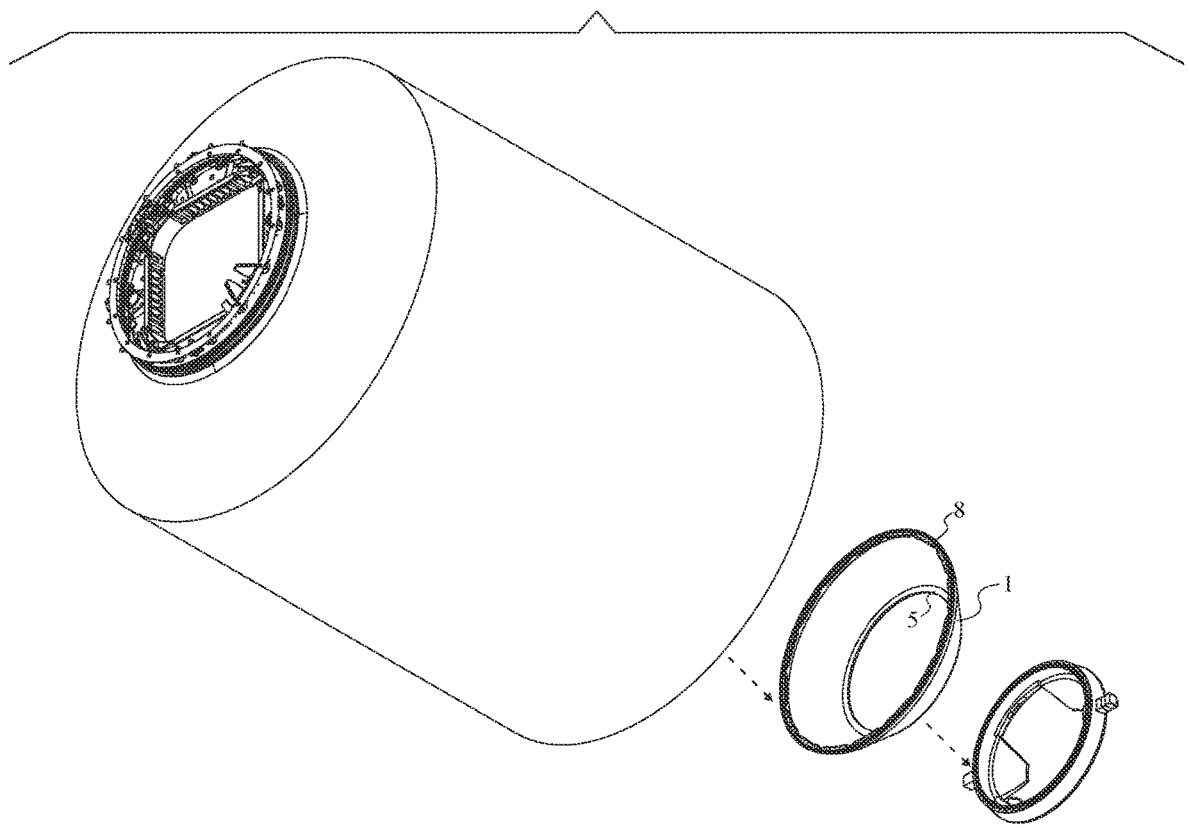
FIG. 12 is a bottom rear exploded perspective view of the present invention, wherein the present invention is shown used to mount the docking system to the CBM mounting interface.
Figure 13:
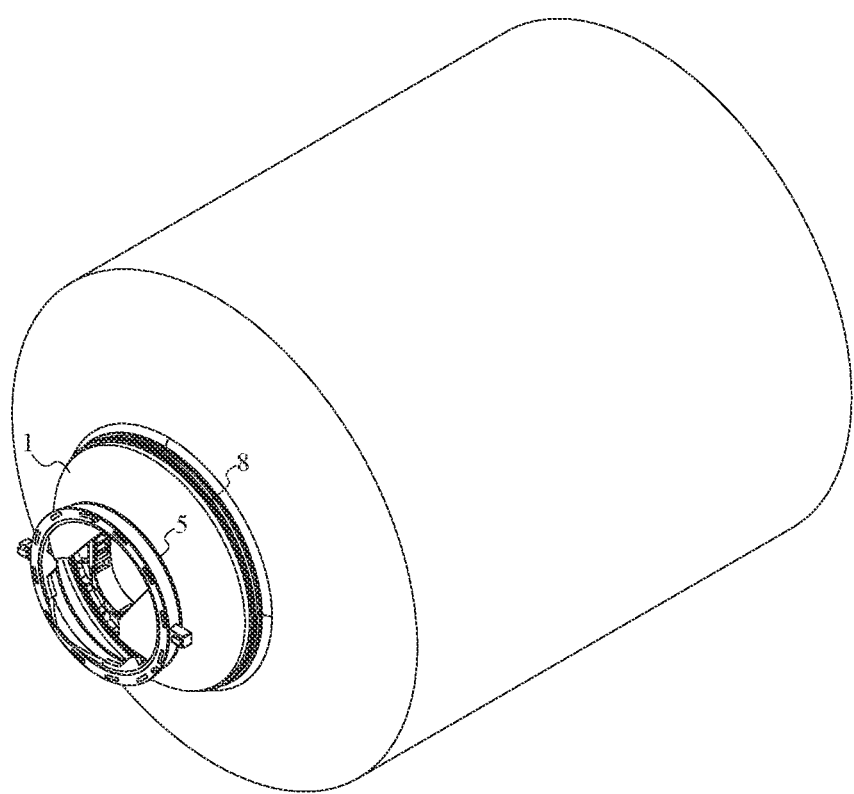
FIG. 13 is a top front perspective view of the present invention, wherein the present invention is shown used to mount the docking system to the CBM mounting interface.

In an exemplary embodiment, the present invention can be used as follows. As can be seen in FIGS. 11 through 13, a CBM bulkhead designed to accommodate active or passive CBMs can be used with a docking system by utilizing the present invention. To do so, the hollow body 1 is fastened to the CBM bulkhead by fastening the second interfacing ring 8 to the CBM interface of the CBM bulkhead. Several bulkhead bolts and O-ring seals can be used to completely seal the connection between the second interfacing ring 8 and the CBM interface of the CBM bulkhead. Then, the docking system is fastened to the hollow body 1 by fastening the docking system to the first interfacing ring 5. This way, the CBM bulkhead can be attached to another module or system using the docking system without having to alter the CBM interface. Thus, the manufacturer can standardize the structural design of the modules by using CBM bulkheads exclusively. In other embodiments, the present invention can be modified to be utilized in different systems.

Although the invention has been explained in relation to its preferred embodiment, it is to be understood that many other possible modifications and variations can be made without departing from the spirit and scope of the invention.

What is claimed is:

1. An adapter for attaching a docking system to a common berthing mechanism (CBM) mounting interface comprising:
   a hollow body;
   a first interfacing ring;
   a second interfacing ring;
   a plurality of first holes;
   a plurality of second holes;
   the hollow body comprising a diametrically-smaller open end and a diametrically-larger open end;
   the diametrically-smaller open end and the diametrically-larger open end being positioned opposite to each other about the hollow body;
   the diametrically-smaller open end, the diametrically-larger open end, the first interfacing ring, and the second interfacing ring being concentrically positioned with each other;
   the first interfacing ring being connected around the diametrically-smaller open end;
   the second interfacing ring being mounted around the diametrically-larger open end;
   the plurality of first holes being distributed around the first interfacing ring;
   the plurality of first holes traversing into the first interfacing ring, opposite to the hollow body;
   the plurality of second holes being distributed around the second interfacing ring; and
   the plurality of second holes traversing through the second interfacing ring.

2. The adapter for attaching a docking system to a CBM mounting interface as claimed in claim 1 comprising:
   a tubular extension;
   the tubular extension comprising a proximal open end and a distal open end;
   the proximal open end the distal open end being positioned opposite to each other about the tubular extension;
   the tubular extension being concentrically positioned with the diametrically-smaller open end, the diametrically-larger open end, the first interfacing ring, and the second interfacing ring;
   the proximal open end being connected around the diametrically-larger open end; and
   the second interfacing ring being connected around the distal open end.

3. The adapter for attaching a docking system to a CBM mounting interface as claimed in claim 2, wherein a diameter of the proximal open end and a diameter of the distal open end are equal to a diameter of the diametrically-larger open end.

4. The adapter for attaching a docking system to a CBM mounting interface as claimed in claim 1 comprising:
   the first interfacing ring and the second interfacing ring being a pair of flat annular bodies; and
   the pair of flat annular bodies being positioned parallel and offset from each other.

5. The adapter for attaching a docking system to a CBM mounting interface as claimed in claim 1 comprising:
   the first interfacing ring being a flat annular body;
   the first interfacing ring comprising a first outer annular edge and a first inner annular edge;
   the first outer annular edge being connected around the diametrically-smaller open end; and
   the first inner annular edge being encircled by the diametrically-smaller open end.

6. The adapter for attaching a docking system to a CBM mounting interface as claimed in claim 5 comprising:
   the plurality of first holes being radially distributed around the first interfacing ring; and
   each of the plurality of first holes traversing perpendicular into the first interfacing ring.

7. The adapter for attaching a docking system to a CBM mounting interface as claimed in claim 1 comprising:
   the second interfacing ring being a flat annular body;
   the second interfacing ring comprising a second outer annular edge and a second inner annular edge;
   the diametrically-larger open end being encircled by the second outer annular edge; and
   the second inner annular edge being encircled by the diametrically-larger open end.

8. The adapter for attaching a docking system to a CBM mounting interface as claimed in claim 7 comprising:
   the plurality of second holes comprising a plurality of inner holes and a plurality of outer holes;
   the plurality of inner holes being radially distributed around the second interfacing ring;
   the plurality of outer holes being radially distributed around the second interfacing ring;
   each of the plurality of inner holes and each of the plurality of outer holes traversing perpendicular through the second interfacing ring;
   each of the plurality of outer holes being positioned in between the second outer annular edge and the diametrically-larger open end; and
   each of the plurality of inner holes being positioned in between the diametrically-larger open end and the second inner annular edge.

9. The adapter for attaching a docking system to a CBM mounting interface as claimed in claim 1 comprising:
   a plurality of indentations;
   the second interfacing ring comprising a second inner annular edge;
   the plurality of indentations being radially distributed around the second interfacing ring; and
   the plurality of indentations being integrated into the second inner annular edge.

10. The adapter for attaching a docking system to a CBM mounting interface as claimed in claim 1 comprising:
    a plurality of annular seal-receiving channels;
    the plurality of annular seal-receiving channels being concentrically positioned with the second interfacing ring; and
    the plurality of annular seal-receiving channels traversing into the second interfacing ring, opposite to the hollow body.

11. The adapter for attaching a docking system to a CBM mounting interface as claimed in claim 10 comprising:
    the second interfacing ring comprising a second outer annular edge and a second inner annular edge;

the plurality of annular seal-receiving channels comprising an inner annular channel, an intermediate annular channel, and an outer annular channel;
the outer annular channel being positioned offset from the second outer annular edge;
the inner annular channel being positioned adjacent to the second inner annular edge; and
the intermediate annular channel being positioned in between the second outer annular edge and the second inner annular edge.

12. The adapter for attaching a docking system to a CBM mounting interface as claimed in claim 1 comprising:
a plurality of structural ribs;
the hollow body further comprising an interior surface;
the plurality of structural ribs being positioned within the hollow body;
the plurality of structural ribs being radially distributed around the hollow body;
each of the plurality of structural ribs being connected onto the interior surface; and
each of the plurality of structural ribs traversing from the diametrically-smaller open end to the diametrically-larger open end.

13. The adapter for attaching a docking system to a CBM mounting interface as claimed in claim 1, wherein the hollow body is a truncated conical shape.

14. An adapter for attaching a docking system to a common berthing mechanism (CBM) mounting interface comprising:
a hollow body;
a first interfacing ring;
a second interfacing ring;
a plurality of first holes;
a plurality of second holes;
the hollow body comprising a diametrically-smaller open end and a diametrically-larger open end;
the hollow body being a truncated conical shape;
the diametrically-smaller open end and the diametrically-larger open end being positioned opposite to each other about the hollow body;
the diametrically-smaller open end, the diametrically-larger open end, the first interfacing ring, and the second interfacing ring being concentrically positioned with each other;
the first interfacing ring being connected around the diametrically-smaller open end;
the second interfacing ring being mounted around the diametrically-larger open end;
the plurality of first holes being distributed around the first interfacing ring;
the plurality of first holes traversing into the first interfacing ring, opposite to the hollow body;
the plurality of second holes being distributed around the second interfacing ring;
the plurality of second holes traversing through the second interfacing ring;
the first interfacing ring and the second interfacing ring being a pair of flat annular bodies; and
the pair of flat annular bodies being positioned parallel and offset from each other.

15. The adapter for attaching a docking system to a CBM mounting interface as claimed in claim 14 comprising:
a tubular extension;
the tubular extension comprising a proximal open end and a distal open end;
the proximal open end the distal open end being positioned opposite to each other about the tubular extension;
the tubular extension being concentrically positioned with the diametrically-smaller open end, the diametrically-larger open end, the first interfacing ring, and the second interfacing ring;
the proximal open end being connected around the diametrically-larger open end;
the second interfacing ring being connected around the distal open end; and
a diameter of the proximal open end and a diameter of the distal open end being equal to a diameter of the diametrically-larger open end.

16. The adapter for attaching a docking system to a CBM mounting interface as claimed in claim 14 comprising:
the first interfacing ring comprising a first outer annular edge and a first inner annular edge;
the first outer annular edge being connected around the diametrically-smaller open end;
the first inner annular edge being encircled by the diametrically-smaller open end;
the plurality of first holes being radially distributed around the first interfacing ring; and
each of the plurality of first holes traversing perpendicular into the first interfacing ring.

17. The adapter for attaching a docking system to a CBM mounting interface as claimed in claim 14 comprising:
the second interfacing ring comprising a second outer annular edge and a second inner annular edge;
the plurality of second holes comprising a plurality of inner holes and a plurality of outer holes;
the diametrically-larger open end being encircled by the second outer annular edge;
the second inner annular edge being encircled by the diametrically-larger open end;
the plurality of inner holes being radially distributed around the second interfacing ring;
the plurality of outer holes being radially distributed around the second interfacing ring;
each of the plurality of inner holes and each of the plurality of outer holes traversing perpendicular through the second interfacing ring;
each of the plurality of outer holes being positioned in between the second outer annular edge and the diametrically-larger open end; and
each of the plurality of inner holes being positioned in between the diametrically-larger open end and the second inner annular edge.

18. The adapter for attaching a docking system to a CBM mounting interface as claimed in claim 14 comprising:
a plurality of indentations;
the second interfacing ring comprising a second inner annular edge;
the plurality of indentations being radially distributed around the second interfacing ring; and
the plurality of indentations being integrated into the second inner annular edge.

19. The adapter for attaching a docking system to a CBM mounting interface as claimed in claim 14 comprising:
a plurality of annular seal-receiving channels;
the second interfacing ring comprising a second outer annular edge and a second inner annular edge;
the plurality of annular seal-receiving channels comprising an inner annular channel, an intermediate annular channel, and an outer annular channel;

the plurality of annular seal-receiving channels being concentrically positioned with the second interfacing ring;

the plurality of annular seal-receiving channels traversing into the second interfacing ring, opposite to the hollow body;

the outer annular channel being positioned offset from the second outer annular edge;

the inner annular channel being positioned adjacent to the second inner annular edge; and the intermediate annular channel being positioned in between the second outer annular edge and the second inner annular edge.

20. The adapter for attaching a docking system to a CBM mounting interface as claimed in claim 14 comprising:

a plurality of structural ribs;

the hollow body further comprising an interior surface;

the plurality of structural ribs being positioned within the hollow body;

the plurality of structural ribs being radially distributed around the hollow body;

each of the plurality of structural ribs being connected onto the interior surface; and each of the plurality of structural ribs traversing from the diametrically-smaller open end to the diametrically-larger open end.

* * * * *